H. A. ROSENTHAL.
Pigeon-Starter.

No. 159,846 — Patented Feb. 16, 1875.

WITNESSES:
Gustave Dietrich
A. F. Terry

INVENTOR:
Henry A. Rosenthal
BY Munn & Co.
ATTORNEYS.

THE GRAPHIC CO. PHOTO-LITH. 39 & 41 PARK PLACE, N.Y.

UNITED STATES PATENT OFFICE.

HENRY A. ROSENTHAL, OF BROOKLYN, NEW YORK.

IMPROVEMENT IN PIGEON-STARTERS.

Specification forming part of Letters Patent No. 159,846, dated February 16, 1875; application filed January 25, 1875.

*To all whom it may concern:*

Figure 1:
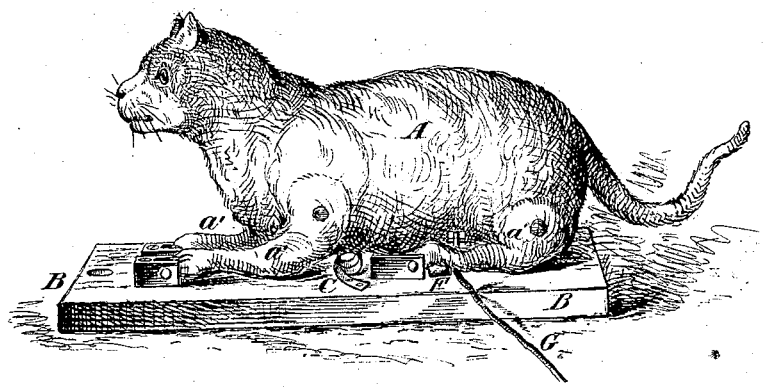
Figure 2:
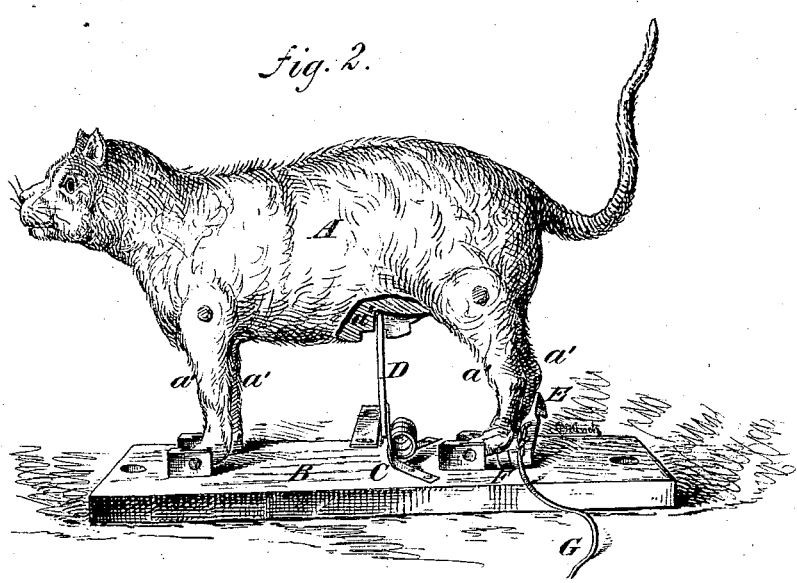

Be it known that I, Dr. HENRY A. ROSENTHAL, of Brooklyn, in the county of Kings and State of New York, have invented a new and useful Improvement in Pigeon - Starter, of which the following is a specification:

Figure 1 represents my improved starter, as set; and Fig. 2 represents it as sprung, part being broken away to show the construction.

Similar letters of reference indicate corresponding parts.

My invention has for its object to furnish an improved device for use in pigeon-shooting, to start the birds out of the trap when it has been sprung, and which shall be simple in construction, convenient in use, and effective in operation, starting the birds instantly and surely.

The invention consists in an improved pigeon-starter, formed by the combination of the body, the rigid pivoted legs, the spring, the lever, the spring-catch, and the trip-cord with each other and a base-board; and in the employment, as a pigeon-starter, of a figure made to represent the body of an animal, and provided with suitable mechanism to enable it to be set in a crouching position, and to be sprung into an erect position, as hereinafter fully described.

A represents the figure of a cat or other animal, the legs $a^1$ of which are made rigid, and are pivoted at their upper ends to the body A of the animal. The lower ends or feet of the legs $a^1$ are pivoted to a base-board, B, which is made of any convenient size, and is designed to be staked to the ground. To the base B, between the fore and rear legs $a^1$ of the body A, is secured a coiled spring, C, to which is attached the lower end of a lever, D. The upper end of the lever D rests against a shoulder or other stop, $a^2$, formed in or attached to the body A, or is pivoted to said body.

Flanges may be attached to the lower side of the body A, or a groove may be formed in said body, to serve as a guide to keep the lever D in line.

To the base B, in proper position to catch upon the upper part of the lever D when pressed down, is pivoted a catch, E, which is held forward by a spring, F, attached to the base-board B. To the spring-catch E F is attached the end of a cord, G, the other end of which may be attached to the trip-rope of the trap, or extended to the station of the man that manages the trap.

In using the starter, it is placed near the trap with the animal's head toward the said trap, the body being held in a crouching position by the spring-catch. The starter is then tripped at the same time that the trap is sprung, or immediately afterward. As the animal springs into an erect position toward the trap the pigeons are frightened from the trap, and immediately rise into the air.

As traps have heretofore been used, it frequently happens that the pigeons will not leave the trap when it is sprung, and have to be frightened out by shouting and throwing stones, &c., which tends to make the sportsman nervous, and frequently causes him to lose his shot. It also frequently happens that the pigeons when they leave the trap will run along the ground for a distance before rising into the air.

Neither of these troubles can happen when my improved starter is used, as the birds will be frightened, causing them to leave the trap and rise at once into the air.

Having thus described my invention, I claim as new and desire to secure by Letters Patent—

1. An improved pigeon - starter, formed by the combination of the body A, the rigid pivoted legs $a^1$, the spring C, lever D, spring-catch E F, and trip-cord G with each other and a base-board, B, substantially as herein shown and described.

2. A pigeon - starter consisting of a figure made to represent the body of an animal, and provided with suitable mechanism to enable it to be set in a crouching position, and to be sprung into an erect position, substantially as herein shown and described.

HENRY A. ROSENTHAL.

Witnesses:
JAMES T. GRAHAM,
T. B. MOSHER.